May 28, 1957  H. C. SLECHTA  2,793,601
STRIP GUIDE FOR CABLE SHEATH FORMING MACHINE
Filed Oct. 8, 1953
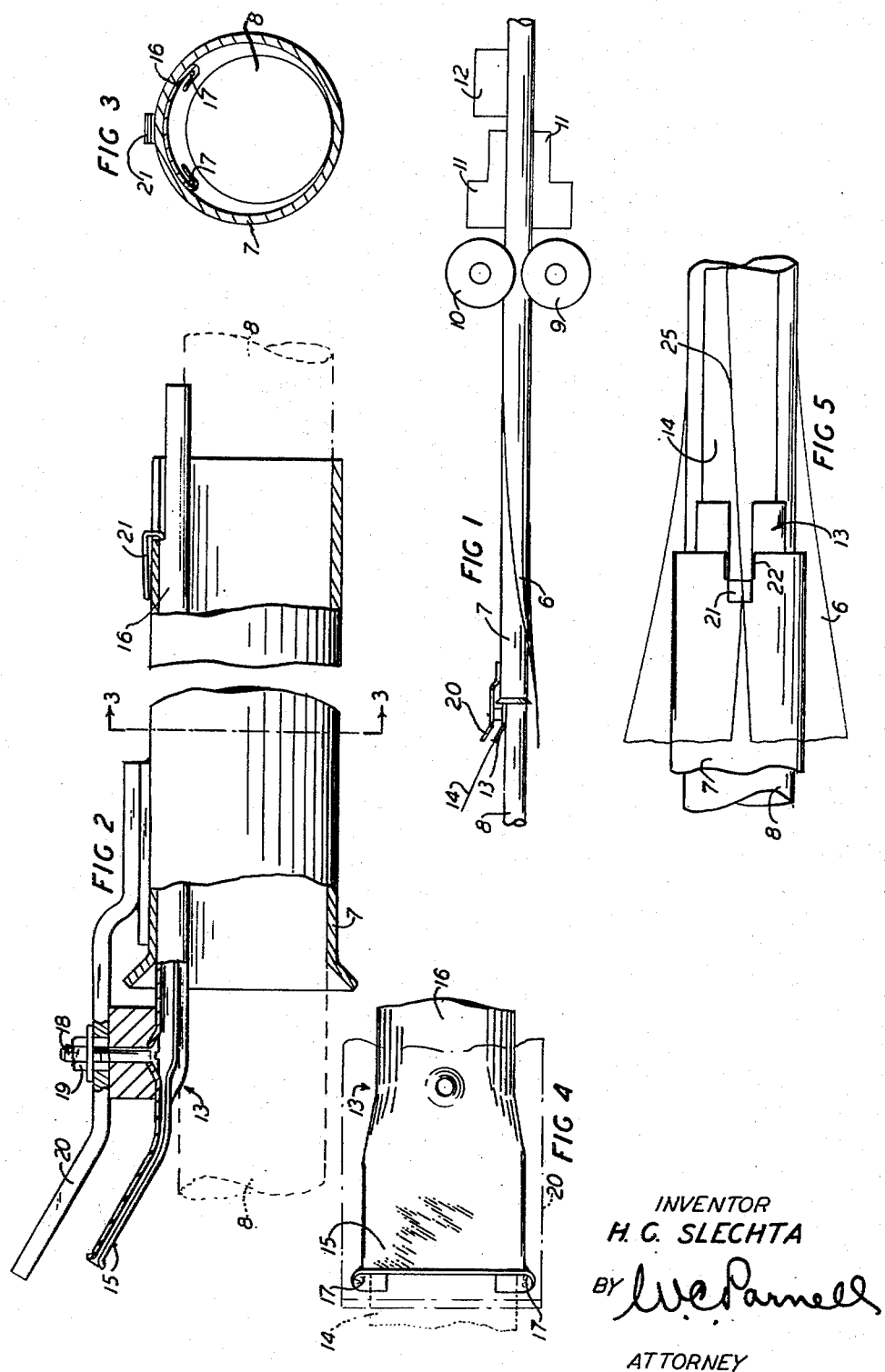
INVENTOR
H. C. SLECHTA
BY W.C. Parnell
ATTORNEY

United States Patent Office 2,793,601
Patented May 28, 1957

2,793,601

STRIP GUIDE FOR CABLE SHEATH FORMING MACHINE

Henry C. Slechta, Plainfield, N. J., assignor to Western Electric Company, Incorporated, New York, N. Y., a corporation of New York Application October 8, 1953, Serial No. 384,901

2 Claims. (Cl. 113—33)

This invention relates to a guide for applying a strip of insulation to electrical cables and particularly to a guide for holding a strip of insulation in longitudinal alignment under the over-lap of a sheath on the cable as the sheath is being formed and until the strip is secured in place under the seam of the fully formed sheath.

In the manufacture of the telephone cables which have a metal sheath formed around the cable core with a longitudinal, soldered seam, it has been found difficult to avoid some charring of the cable insulation during the soldering operation.

It is the object of this invention to guide a protective strip of insulation into place on a cable beneath the seam as the sheath is being formed.

In one type of machine for sheathing such cables, the sheathing is partially formed about a tubular mandrel through which the cable is passed. Means are provided beyond the discharge end of the mandrel for closing the sheathing around the cable to form a seam and for soldering the seam.

As applied to a machine of this type, the guide of the present invention comprises a flat, insulation receiving portion inclined toward the axis of the mandrel, a transversely curved portion extending through the mandrel, a lateral flange on each side of the guide and means for attaching the guide to the mandrel in position to hold the strip of insulation in alignment until it is clamped in place by the closing of the seam.

According to a feature of the invention, a guard, which is attached to the receiving end of the mandrel, is provided to protect the inclined, receiving end of the guide.

Other features of the invention will be more readily understood from the following detailed description taken in conjunction with the accompanying drawing in which:

Fig. 1 is a side elevational view of a forming tube and associated equipment of a cable sheathing machine modified in accordance with the principles of the invention;

Fig. 2 is a partially broken view of the forming tube portion of Fig. 1;

Fig. 3 is a sectional view of the forming tube through the plane of line 3—3 of Fig. 2;

Fig. 4 is a plan view of the receiving end of the insulating strip guide showing the guard therefor in phantom; and Fig. 5 is a plan view of the output end of the forming tube showing the cable sheath in phantom.

Referring now to the drawing, it is to be noted that many of the details of the sheath forming machine such as the means for forming the metal sheath 6 around the tubular mandrel or forming tube 7 and associated equipment are not shown as they are not required for an understanding of the present invention. Apparatus of this type is disclosed in the co-pending application of E. W. Reynolds and H. C. Slechta entitled "Sheath Forming Apparatus," Serial No. 308,962, filed September 11, 1952 now Patent No. 2,764,214, issued September 25, 1956.

The forming tube 7 takes the thrust of the forming operations and protects the cable core 8 until the sheath has been given a circular contour about the core 8. The forming rollers 9 and 10 complete the circular shaping of the sheath 6 about the core 8 and maintain the edges of the sheath at spaced positions until after the sheathed core enters the lapping die 11 where the edges are clamped together in position for soldering which operation is performed immediately thereafter. As the means for soldering this sheath has no bearing on the invention, they are simulated by box 12 of the drawing.

The insulation guide 13 of the present invention comprises a flat, insulation receiving portion 15 inclined toward the axis of the forming tube 7, a transversely curved portion 16 (Fig. 3) extending through the tube 7 and a lateral flange 17 on each side of the guide.

The guide is attached to the tube 7 in a position to hold the strip of insulation 14 in alignment with the seam 25 being formed in the sheath 6 directly over it. The guide is held in place by the bolt 18 and nut 19 secured to the guard 20. The guard 20 is provided to protect the entrance end of the guide 13, the guard being welded to the top of the entrance end of the forming tube 7. The other end of the guide 13 is fastened to the tube 7 by the portion 21 bent up into the slot 22 provided therefor in the tube 7.

It is to be understood that the above described arrangement is simply illustrative of the application of the principles of the invention. Numerous other arrangements may be readily devised by those skilled in the art which will embody the principles of the invention and fall within the spirit and scope thereof.

What is claimed is:

1. In a cable sheathing machine the combination with a tubular mandrel through which the cable to be sheathed is passed and around which metal sheathing for the cable is partially formed, means beyond the discharge end of the mandrel for closing the sheathing around the cable to form a seam and means beyond the discharge end of the sheath closing means for soldering the seam, of a guide for a strip of insulation to be laid on the cable under the seam, said guide having a flat insulation receiving portion inclined toward the axis of the mandrel, a transversely curved portion extending through the mandrel, a lateral flange on each side of the guide and means for attaching the guide to the mandrel in a position to hold the strip of insulation in alignment until it is clamped in place by the closing of the seam.

2. In a cable sheathing machine the combination with a tubular mandrel through which the cable to be sheathed is passed and around which metal sheathing for the cable is partially formed, means beyond the discharge end of the mandrel for closing the sheathing around the cable to form a seam and means beyond the discharge end of the sheath closing means for soldering the seam, of a guide for a strip of insulation to be laid on the cable under the seam, said guide having a flat insulation receiving portion inclined toward the axis of the mandrel, a transversely curved portion extending through the mandrel, a lateral flange on each side of the guide, a guard for the entrance end of the guide attached to the entrance end of the mandrel and means at each end of the guide for supporting it within the mandrel in a position to hold the strip of insulation in alignment until it is clamped in place by the closing of the seam.

References Cited in the file of this patent

UNITED STATES PATENTS

| | | |
|---|---|---|
| 2,156,952 | Morsing | May 2, 1939 |
| 2,372,645 | Barmack | Apr. 3, 1945 |